United States Patent [19]

Reimann et al.

[11] 4,135,799
[45] Jan. 23, 1979

[54] PHOTOGRAPHIC CAMERA WITH FLASHLIGHT CONTACTS

[75] Inventors: Hubertus Reimann; Werner Hahn; Herbert Welzel, all of Dresden, German Democratic Rep.

[73] Assignee: VEB Pentacon Dresden Kamera und Kinowerke, Dresden, German Democratic Rep.

[21] Appl. No.: 747,182

[22] Filed: Dec. 3, 1976

[30] Foreign Application Priority Data

Dec. 10, 1975 [DD] German Democratic Rep. ... 190007
Jul. 7, 1976 [DD] German Democratic Rep. ... 193737

[51] Int. Cl.² .............................................. G03B 15/03
[52] U.S. Cl. .................................................... 354/147
[58] Field of Search .............. 354/147, 132, 139, 143, 354/141, 146, 148, 149, 246; 200/52 R, 61.58 R, 16 A, 153 D, 153 H, DIG. 6

[56] References Cited

U.S. PATENT DOCUMENTS

| | | | |
|---|---|---|---|
| 3,355,559 | 11/1967 | Hahn et al. | 354/147 X |
| 3,883,884 | 5/1975 | Fuchsel | 354/147 X |
| 3,927,412 | 12/1975 | Ellin | 354/147 X |
| 4,024,550 | 5/1977 | Yazaki | 354/147 |
| 4,039,898 | 8/1977 | Iwata | 354/147 X |

*Primary Examiner*—L. T. Hix
*Assistant Examiner*—William B. Perkey
*Attorney, Agent, or Firm*—William Anthony Drucker

[57] ABSTRACT

A flash switching arrangement for a camera which includes a shutter with an opening leaf and a closing leaf and has a contact nipple and a contact shoe for the attachment of flash units. The switching arrangement includes first and second switching means electrically connected between the first contact shoe and the contact nipple respectively. First coupling means are connectible between the first and second switching means and the opening leaf of the shutter. Second coupling means are connectible between the first and second switching means and the closing leaf of the shutter. On actuation of the shutter, the opening leaf effects closure of both the first and second switching means to ignite the flash unit and after exposure, the closing leaf effects opening of both the first and second switching means.

5 Claims, 6 Drawing Figures

PHOTOGRAPHIC CAMERA WITH FLASHLIGHT CONTACTS

BACKGROUND OF THE INVENTION

The invention concerns a switching arrangement for flash-synchronising devices in photographic carmeras, having a contact nipple for a cable connected flash unit and a contact shoe for the direct attachment of a flash unit which contacts can be disconnected from one another.

In existing flash-synchronising devices of this kind the contact shoe can be disconnected from the electrically parallel-connected contact nipple by means of switches which can be actuated by operating knobs projecting from the camera housing. In spite of the more or less well covered arrangement these operating knobs are accessible to the photographer. In addition by these known arrangements the lead to the contact shoe is also equipped with a switch on account of which the contact resistance in this lead is unfavourably affected.

The purpose of the invention is to avoid the disadvantages described by means of a novel arrangement for operating the switching.

SUMMARY OF THE INVENTION

According to the invention there is provided in a camera including a shutter with an opening leaf and a closing leaf and having a contact nipple and a contact shoe for the attachment of flash units, the provision of a switching arrangement comprising first and second switching means electrically connected between the contact shoe and contact nipple respectively; first coupling means connectible between said first and second switching means and the opening leaf of said shutter; and second coupling means connectible between said first and second switching means and the closing leaf of said shutter; whereby on actuation of the shutter, the opening leaf effects closure of both said first and second switching means to ignite the flash unit and after exposure said closing leaf effects opening of both said first and second switching means.

In a first variant, an ignition switch and a cut-out switch are provided in each of the connecting leads for the contact nipple and the contact shoe; in this way the ignition switches can be closed by the opening leaves which uncover the picture aperture and the operation of the cut-out switches to the open position is effected by the closing leaves which re-cover the picture aperture.

In a further variant, an ignition switch is provided in each of the leads for the contact nipple and the contact shoe in which these ignition switches can both be closed by the opening leaves which uncover the picture aperture and returned to their open position by the closing leaves which re-cover the picture aperture.

BRIEF DESCRIPTION OF DRAWINGS

The invention is explained by means of descriptive and illustrative examples. The following figures apply.

DESCRIPTION OF PREFERRED EMBODIMENTS

Figure 1:
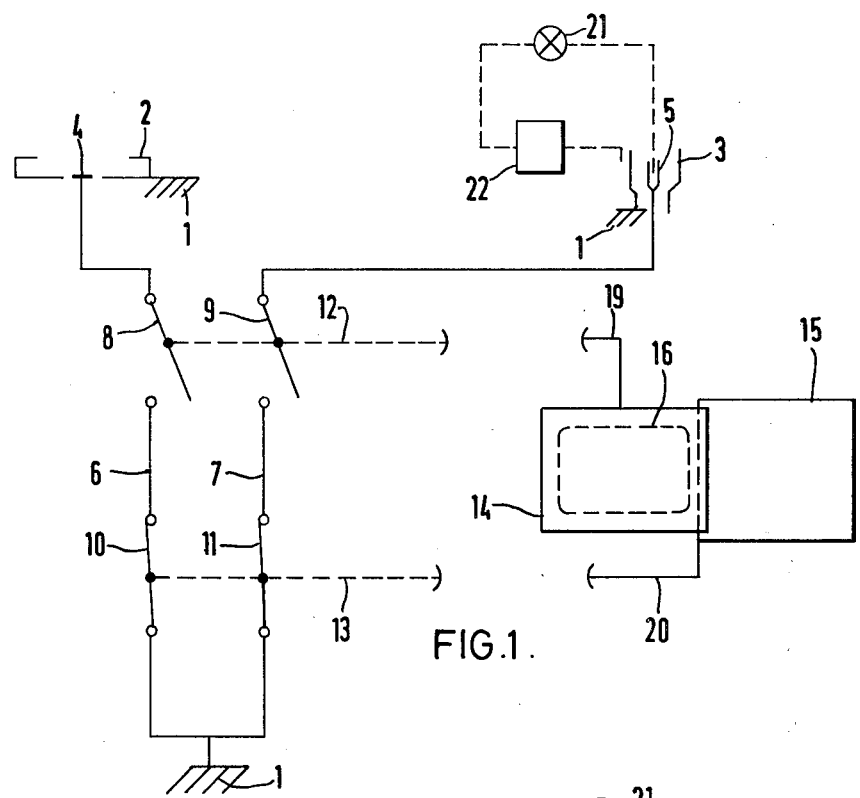
FIG. 1 is a switching arrangement corresponding to the first variant; camera shutter would up.
Figure 2:
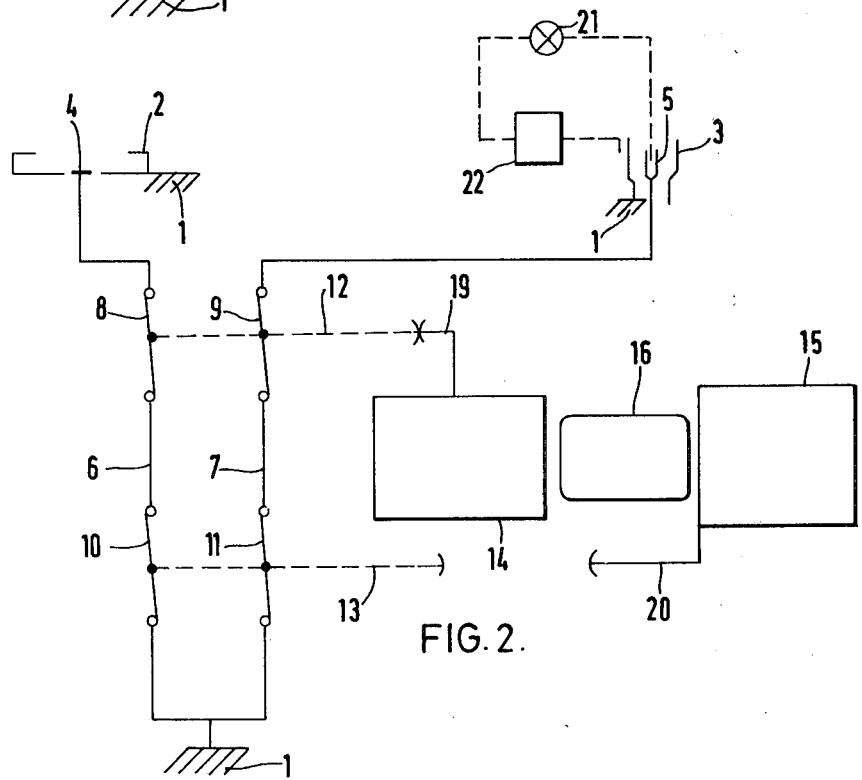
FIG. 2 is the switching arrangement of FIG. 1 with camera shutter open.
Figure 3:
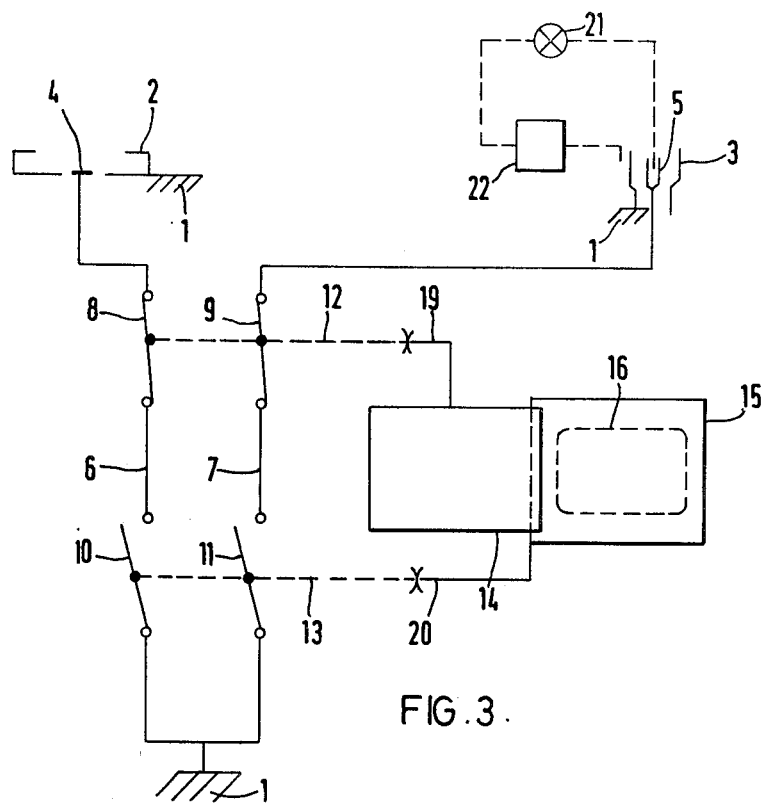
FIG. 3 is the switching arrangement of FIG. 1 with camera shutter released.

In the constructional example of FIGS. 1 to 3, a contact shoe 2 and a contact nipple 3 are mounted on a camera housing 1, which is not described in detail; these serve as alternative means for the connection of flash units. The center contact 4 of the contact shoe 2 and the center socket 5 of the contact nipple 3 are connected to separate leads 6 and 7 in parallel. In each of the leads 6 and 7 are ignition switches 8 and 9 respectively and cut-out switches 10 and 11 respectively connected in series. Switches 8 and 10 together and switches 9 and 11 together form first and second switching means respectively. The two ignition (flash synchronizing) switches 8 and 9 are rigidly coupled together by the non-conductive actuating rod 12 and the two cut-out switches 10 and 11 by the non-conductive actuating rod 13. The exposure process is effected by opening and closing leaves 14 and 15 respectively. The opening leaf 14 carries an ignition push-rod 19. The closing leaf 15 carries a switching (cut-out) push-rod 20. The ignition push-rod 19 works in conjunction with the actuating rod 12, while the switching push-rod 20 works in conjunction with the actuating rod 13. To the contact nipple 3 is connected a flash unit, of which the discharge lamp 21 can be ignited by means of a high voltage source 22.

The mode of operation of this arrangement is as follows:

In the wound-up condition, i.e. when the camera is ready for exposure (see FIG. 1), the opening leaf 14 covers the picture aperture 16. The ignition switches 8 and 9 are open, the cut-out switches 10 and 11 are closed. The center contact 4 is therefore electrically separated from the center socket 5.

After initiation of the exposure process the opening leaf 14 is moved into the position shown in FIG. 2 so that the picture aperture 16 is open. At the same time, the ignition push-rod 19 bears on the actuating rod 12 so that both the ignition switches 8 and 9 are closed. Both leads 6 and 7 are therefore connected through and the discharge lamp 21, which is connected to contact nipple 3, is ignited.

When the closing leaf 15 runs into the position shown in FIG. 3, the exposure process is concluded, since the closing leaf 15 re-covers the picture aperture 16. At the same time, the switching push-rod 20 bears on the actuating rod 13 so that the two cut-out switches 10 and 11 are opened. Both leads 6 and 7 are therefore opened again and the center contact 4 is electrically cut off from the center socket 5.

In spite of any flash equipment that may be connected to the contact nipple 3, the photographer can receive no shock nor can the discharge lamp 21 be ignited either by touching or by short-circuiting the center contact 4 and the contact shoe 2.

Figure 4:
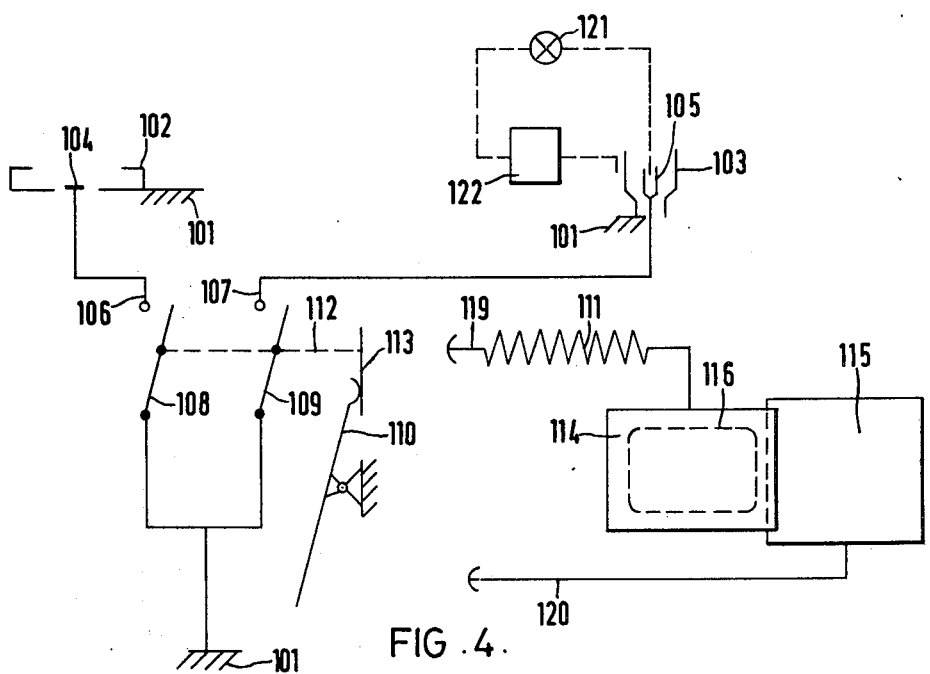
FIG. 4 is a switching arrangement corresponding to the second variant; camera shutter wound up.
Figure 5:
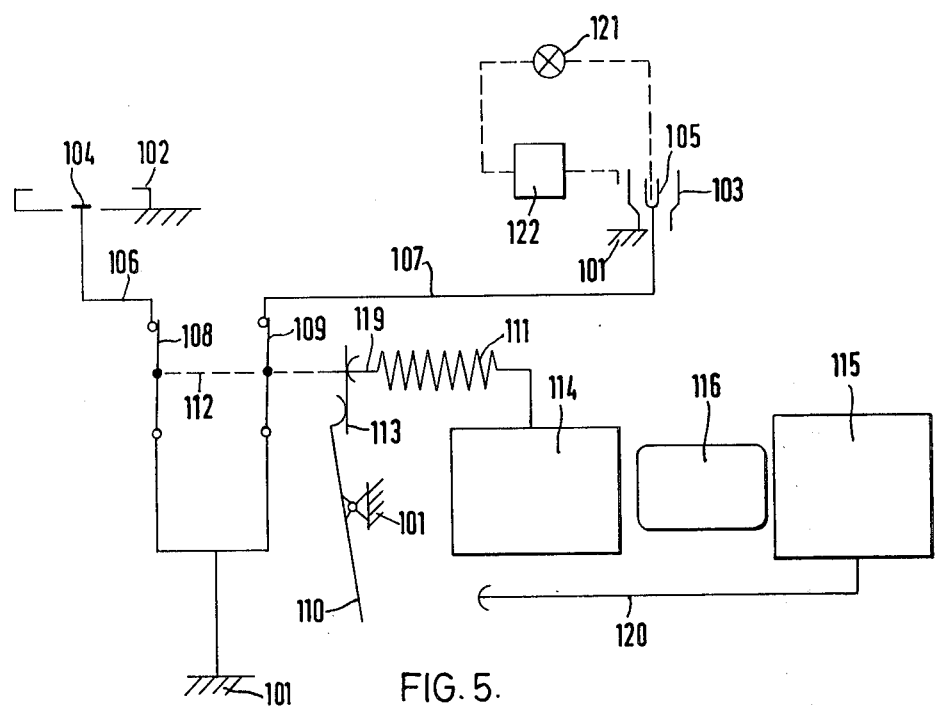
FIG. 5 is the switching arrangement of FIG. 4 with camera shutter open.
Figure 6:
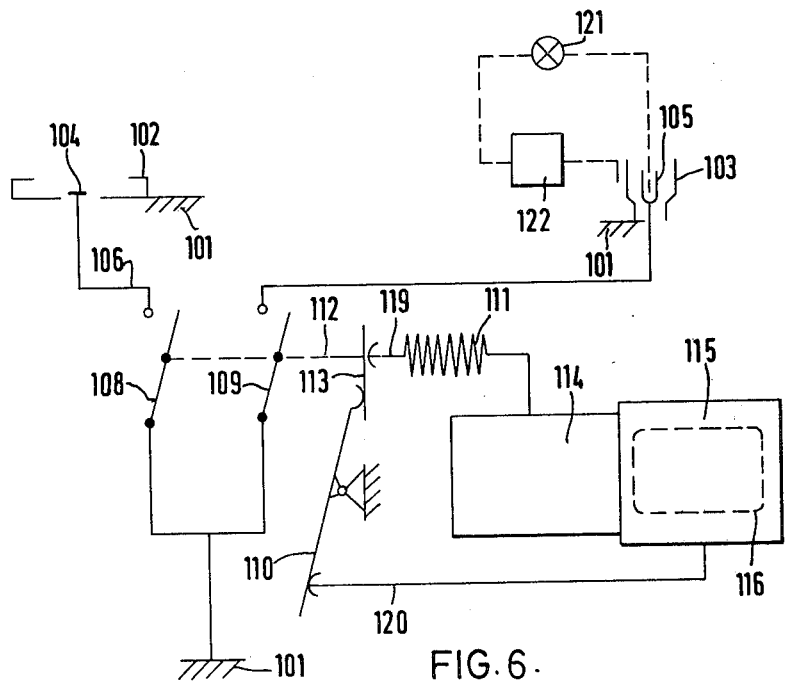
FIG. 6 is the switching arrangement of FIG. 5 with camera shutter released.

In the contructional example of FIGS. 4 to 6, the contact shoe 102 and the contact nipple 103 are mounted on a camera housing 101, not described in detail; these serve for the connection of flash units. The center contact 104 of the contact shoe 102 and the center socket 105 of the contact nipple 103 are connected in parallel with leads 106 and 107. In the leads 106 and 107 are connected in series ignition switches 108 and 109 respectively. Switches 108 and 109 form first and second switching means respectively. The two ignition switches 108 and 109, which are normally open, are rigidly coupled to one another by the actuating rod 112. One arm of the pivoted double-armed switch lever 110 lies against the switch foot 113. The exposure process of opening and closing the picture aperture 116 is effected by opening and closing leaves 114 and 115. The opening leaf 114 carries an ignition push-rod 119 which is connected to the opening leaf 114 through the spring 111, and the closing leaf 115 carries a switching push-rod 120. The ignition push-rod 119 operates together with the switch foot 113, while the switching push-rod 120 operates with the switch level 110. A flash unit is connected to the contact nipple 103; the discharge lamp 121 of this can be ignited from a high voltage source 122.

The mode of operation of this arrangement is as follows:

In the wound-up condition, i.e. when the camera is in readiness for exposure (cf FIG. 4), the opening leaf 114 covers the picture aperture 116. The ignition switches 108 and 109 are open. The center contact 104 is therefore electrically separated from the center socket 105.

After initiation of an exposure process the opening leaf 114 is moved to the position of FIG. 5, so that the picture aperture 116 is open. At the same time the ignition push-rod 119 bears on the switch foot 113, so that the two ignition switches 108 and 109 are closed by means of the actuating rod 112. Both leads 106 and 107 are therefore connected and the discharge lamp 121 which is connected to the contact nipple 103 is ignited.

When the closing leaf 115 runs into the position of FIG. 6 the exposure process is concluded, since the closing leaf 115 covers the picture aperture 116 again. At the same time the switching push-rod 120 bears on the switch lever 110 so that the switch foot 113 moves against the spring 111 and the ignition switches 108 and 109 are opened again by means of the actuating rod 112. Both leads 106 and 107 are therefore opened once more and the center contact 104 is electrically separated from the center socket 105.

In spite of any flash equipment that may be connected to the contact nipple 103 the photographer can receive no shock nor can the discharge lamp 121 be ignited either by touching or by short-circuiting the center contact 104 and the contact shoe 102.

We claim:

1. In a camera having a housing and including a shutter with an opening leaf and a closing leaf and having a contact nipple for a cable connected flash unit and a contact shoe for the direct attachment of a flash unit, the provision of a flash synchronising arrangement comprising:
   a. first and second switching means electrically connectible between a center contact of the contact shoe and a center contact of the contact nipple respectively and the camera housing;
   b. first coupling means connectible between said first and second switching means and the opening leaf of said shutter to close said first and second switching means on actuation of the shutter to ignite the flash unit when attached to said camera contact shoe or when connected to the contact nipple; and
   c. second coupling means connectible between said first and second switching means and the closing leaf of said shutter to open said first and second switching means after actuation of the shutter and ignition of the flash unit to isolate the center contact of said contact shoe from the center contact of said contact nipple and to isolate the center contacts from said housing.

2. A camera according to claim 1, wherein said first and second switching means each include an ignition contact electrically connectible in series with a cut-out contact; said ignition contacts being connectible with said opening leaf via said first coupling means to effect ignition of the flash unit; and said cut-out contacts being connectible with said closing leaf via said second coupling means to effect opening of said cut-out contacts after exposure is completed.

3. A camera according to claim 2, wherein said first coupling means comprises a push rod attached to said opening leaf and an actuating rod rigidly coupling said ignition contacts to effect closure thereof; and said second coupling means comprises a push rod attached to said closing leaf and an actuating rod rigidly connected to said cut-out contacts to effect opening of said cut-out contacts after exposure is completed.

4. A camera according to claim 3, wherein said push rod is connected to said opening leaf through a spring.

5. In a camera having a housing and including a shutter with an opening leaf and a closing leaf and having a contact nipple for a cable connected flash unit and a contact shoe for the direct attachment of a flash unit, the provision of a flash synchronising arrangement comprising:
   a. first and second switching means electrically connectible between a center contact of the contact shoe and a center contact of the contact nipple respectively and the camera housing;
   b. first coupling means connectible between said first and second switching means and the opening leaf of said shutter to close said first and second switching means on actuation of the shutter to ignite the flash unit when attached to said camera contact shoe or when connected to the contact nipple; and
   c. second coupling means connectible between said first and second switching means and the closing leaf of said shutter to open said first and second switching means after actuation of the shutter and ignition of the flash unit to isolate the center contact of said contact shoe from the center contact of said contact nipple and to isolate the center contacts from said housing, wherein said first coupling means comprises a push rod connected to said opening leaf and an actuating rod rigidly coupling said first and second switching means; and said second coupling means comprises a push rod attached to said closing leaf and a double armed pivoted lever having one arm connected to the actuating rod and having the other arm connectible with the closing leaf push rod to effect opening of the switching means on movement of the closing leaf after exposure is completed.

* * * * *